(12) United States Patent
Zhi et al.

(10) Patent No.: US 8,437,265 B2
(45) Date of Patent: May 7, 2013

(54) METHOD, APPARATUS AND SYSTEM FOR SHARING NETWORK RESOURCES

(75) Inventors: Chunxia Zhi, Shenzhen (CN); Jian Zhang, Shenzhen (CN); Huadong Hu, Shenzhen (CN); Yu Yin, Shenzhen (CN); Lan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 730 days.

(21) Appl. No.: 12/468,533

(22) Filed: May 19, 2009

(65) Prior Publication Data

US 2009/0225719 A1 Sep. 10, 2009

Related U.S. Application Data

(63) Continuation of application No. PCT/CN2008/070129, filed on Jan. 17, 2008.

(30) Foreign Application Priority Data

Jan. 18, 2007 (CN) .......................... 2007 1 0003628
Jun. 19, 2007 (CN) .......................... 2007 1 0127626

(51) Int. Cl.
*G01R 31/08* (2006.01)
*H04W 4/00* (2009.01)
*H04L 12/28* (2006.01)

(52) U.S. Cl.
USPC .......................... 370/252; 370/329; 370/401

(58) Field of Classification Search .................. 370/252, 370/329, 401
See application file for complete search history.

(56) References Cited

U.S. PATENT DOCUMENTS

| 6,094,426 | A | 7/2000 | Honkasalo et al. |
| 7,336,610 | B2 | 2/2008 | Lenzini et al. |
| 8,064,382 | B2 * | 11/2011 | Zisimopoulos et al. ...... 370/322 |
| 8,085,731 | B2 * | 12/2011 | Zhao et al. .................... 370/331 |

(Continued)

FOREIGN PATENT DOCUMENTS

| CN | 1400805 A | 3/2003 |
| CN | 1440145 A | 9/2003 |

(Continued)

OTHER PUBLICATIONS

State Intellectual Property Office of the People'S Republic of China, Written Opinion of the International Searching Authority in International Patent Application No. PCT/CN2008/070129 (Apr. 30, 2008).

(Continued)

*Primary Examiner* — Sai-Ming Chan
(74) *Attorney, Agent, or Firm* — Leydig, Voit & Mayer, Ltd.

(57) ABSTRACT

A method for sharing network resources includes: setting a sharing group based on service types in the process of setting up a bearer and determining a maximum network resource for the sharing group; and allocating a resource for the bearer in the range of the maximum network resource. The present invention also provides a system and an apparatus for sharing network resources. The embodiments of the present invention implement the sharing of a maximum transmission rate among multiple bearers in an evolved network, solve the problem of low network resource utilization caused by the fact that each bearer occupies a fixed bandwidth resource, and implement maximum utilization of network resources.

16 Claims, 15 Drawing Sheets

U.S. PATENT DOCUMENTS

| | | | |
|---|---|---|---|
| 8,126,474 B2* | 2/2012 | Huomo et al. | 455/452.1 |
| 2007/0070958 A1* | 3/2007 | Rinne et al. | 370/338 |
| 2009/0129342 A1* | 5/2009 | Hwang et al. | 370/331 |
| 2010/0284278 A1* | 11/2010 | Alanara | 370/235 |
| 2011/0134863 A1* | 6/2011 | Zisimopoulous et al. | 370/329 |
| 2011/0170506 A1* | 7/2011 | Zisimopoulous et al. | 370/329 |

FOREIGN PATENT DOCUMENTS

| | | |
|---|---|---|
| CN | 1658575 A | 8/2005 |
| CN | 1756176 A | 4/2006 |
| CN | 101227714 B | 4/2011 |
| EP | 1648189 A1 | 1/2005 |
| WO | WO 03/088605 A1 | 10/2003 |

OTHER PUBLICATIONS

State Intellectual Property Office of the People'S Republic of China, Examination Report in Chinese Patent Application No. 200710127626.9 (Mar. 11, 2010).

Global System for Mobile Communications (GSM), "3$^{rd}$ Generation Partnership Project; Technical Specification Group Services and System Aspects; General Packet Radio Service (GPRS); Service Description; Stage 2 (Release 7)," 3GPP TS 23.060 V7.2.0 (Sep. 2006).

Global System for Mobile Communications (GSM), "3$^{rd}$ Generation Partnership Project; Technical Specification Group Services and System Aspects; 3GPP System Architecture Evolution: Report on Technical Options and Conclusions (Release 7)," 3GPP TR 23.882 V1.6.1 (Nov. 2006).

European Patent Office, Extended European Search Report in European Patent Application No. 08700786.0 (Jan. 30, 2012).

2$^{nd}$ Office Action in corresponding Chinese Patent Application No. 201110052117.0 (Aug. 13, 2012).

3$^{rd}$ Office Action in corresponding Chinese Patent Application No. 201110052117.0 (Nov. 13, 2012).

"TS 23.246—3$^{rd}$ Generation Partnership Project; Technical Specification Group Services and System Aspects; Multimedia Broadcast/Multicast Service (MBMS); Architecture and Functional Description (Release 7)," 3GPP Technical Specification, Dec. 2006, V7.1.1, 3GPP, Valbonne, France.

"TS 36.211—3$^{rd}$ Generation Partnership Project; Technical Specification Group Radio Access Network; Physical Channels and Modulation (Release 8)," 3GPP Technical Specification, Dec. 2006, 3GPP, V0.2.2, Valbonne, France.

\* cited by examiner

METHOD, APPARATUS AND SYSTEM FOR SHARING NETWORK RESOURCES

CROSS-REFERENCE TO RELATED APPLICATIONS

This application is a continuation of International Patent Application No. PCT/CN2008/070129, filed Jan. 17, 2008, which claims priority to Chinese Patent Application No. 200710003628.7, filed Jan. 18, 2007 and Chinese Patent Application No. 200710127626.9, filed Jun. 19, 2007, all of which are hereby incorporated by reference in their entirety.

FIELD OF THE INVENTION

The present invention relates to mobile communication technologies, and in particular, to a method, apparatus, and system for sharing network resources.

BACKGROUND OF THE INVENTION

FIG. 1 is a flowchart of network registration during the initial access of a User Equipment, UE, in an evolved network, including the following steps.

Step 101: The UE sends a network registration request message to a Mobility Management Entity/User Plane Entity, MME/UPE.

Step 102: The network authenticates the UE.

Step 103: The MME/UPE sends a location update request message to a Home Subscriber Server, HSS.

Step 104: The HSS sends the subscription information of the UE to the MME/UPE.

Step 105: The MME/UPE saves the subscription information of the UE and sends a confirmation message to the HSS.

Step 106: The HSS sends a location update confirmation message to the MME/UPE.

Step 107: The MME/UPE sends a route update message to an Inter Access System Anchor, IASA and requests the Quality of Service, QoS, information required for bearer setup.

Step 108: The IASA interacts with a Policy and Charging Rule Function, PCRF and obtains relevant information and policy rules required for bearer setup.

Step 109: The IASA sends a location update response message to the MME/UPE.

Step 110: The MME/UPE sends a radio bearer request message to an Evolved NodeB, ENB, carrying QoS information and Radio Resource Control, RRC, information to the ENB.

Step 111: The ENB sends QoS information and network resource information to the UE through the RRC connection. This step is optional.

Step 112: The MME/UPE sends a registration accepted message to the UE.

Step 113: The UE sends a registration complete message to the MME/UPE. The registration process ends.

FIG. 2 shows the bearer setup process when the UE completes the network registration and needs to set up a bearer. As shown in FIG. 2, the bearer setup process includes the following steps.

Step 201: The UE and an Application Function, AF, perform service negotiation on an established signaling connection.

Step 202: The AF sends service information to the PCRF. The service information carries the service type and information related to the requested service.

Step 203: The PCRF obtains the subscription information of the UE from the HSS.

Step 204: The PCRF sends a resource request message to the MME/UPE. The message carries information such as the label of the service type corresponding to the current bearer, policies related to the requested service and QoS.

Step 205: The MME/UPE checks the subscription information of the UE, performs access control according to the received QoS information and available resources, and applies the received policy information.

Step 206: The MME/UPE sends a radio resource allocation message to the ENB. The message includes the label of the service type corresponding to the current bearer and maximum available network resource.

Step 207: The ENB performs access control and converts the received QoS information into the required radio QoS information, based on which the ENB allocates a network resource and performs corresponding configuration.

Step 208: The ENB provides required radio configuration information to the UE, and sets up network resource information related to IP or session data flows.

Step 209: The ENB sends a resource setup successful message to the MME/UPE.

Step 210: The MME/UPE reports the resource setup successful message and related QoS information.

In the flowchart shown in FIG. 2, the PCRF in step 203 may also obtain the user's subscription information from a Subscription Profile Repository, SPR, because the SPR may also store the user's subscription information. The HSS and the SPR are two completely independent functional entities, but may be located on the same network node.

Here, the ENB is an option of the Long Term Evolution-Radio Access Network, LTE-RAN, functions. According to actual conditions, the ENB network element may also be replaced by other options of the LTE-RAN functions.

In the conventional art, once the ENB sets up a bearer for the service requested by the UE, the service occupies the network resource allocated by the ENB all the time. When the service only requires part of the allocated network resource, the excess part may not be used by other services.

SUMMARY OF THE INVENTION

An embodiment of the present invention provides a method for sharing network resources. The method includes: determining, a maximum network resource corresponding to a User Equipment, UE, on a Packet Data Network, PDN, or a PDN set, when the UE sets up a bearer with the PDN or the PDN set; and allocating, by a PDN gateway connecting the UE and the PDN or the PDN set and by an Evolved NodeB, ENB, corresponding to the UE, a resource for the bearer in the range of the maximum network resource according to the determined maximum network resource.

An embodiment of the present invention provides a system for sharing network resources, which may implement the sharing of network resources. The system for sharing network resources includes at least a UE, an ENB, a PDN gateway, and a PDN or PDN set. When the UE connected to the PDN gateway sets up a bearer with the PDN or PDN set, the PDN gateway obtains a preset maximum network resource corresponding to the UE on the current PDN or PDN set, and allocates a resource for the current bearer in the range of the maximum network resource. When the UE connected to the ENB sets up a bearer, the ENB obtains a preset maximum network resource corresponding to the UE on the current PDN or PDN set, and allocates a resource for the current bearer in the range of the maximum network resource.

Another embodiment of the present invention provides an apparatus, which may implement the sharing of network resources. The apparatus includes an obtaining unit and an allocating unit. When a UE connected to the PDN gateway sets up a bearer with a PDN or PDN set, the obtaining unit obtains a preset maximum network resource corresponding to the UE on the PDN or PDN set, and sends the maximum network resource to the allocating unit. The allocating unit receives the maximum network resource and allocates a resource for the current bearer in the range of the maximum network resource.

Embodiments of the present invention implement sharing of a maximum network resource among multiple bearers, solve the problem of low network resource utilization caused by the fact that each bearer occupies a fixed bandwidth resource, and implement maximum utilization of the network resource.

DETAILED DESCRIPTION OF THE INVENTION

The present invention is hereinafter described in detail with reference to embodiments and accompanying drawings.

According to the technical schemes of the embodiments of the present invention, multiple bearers share one maximum network resource and resources are allocated for multiple bearers in the range of the maximum network resource. Thus, the sharing of the same maximum network resource is implemented among multiple bearers.

Figure 1:
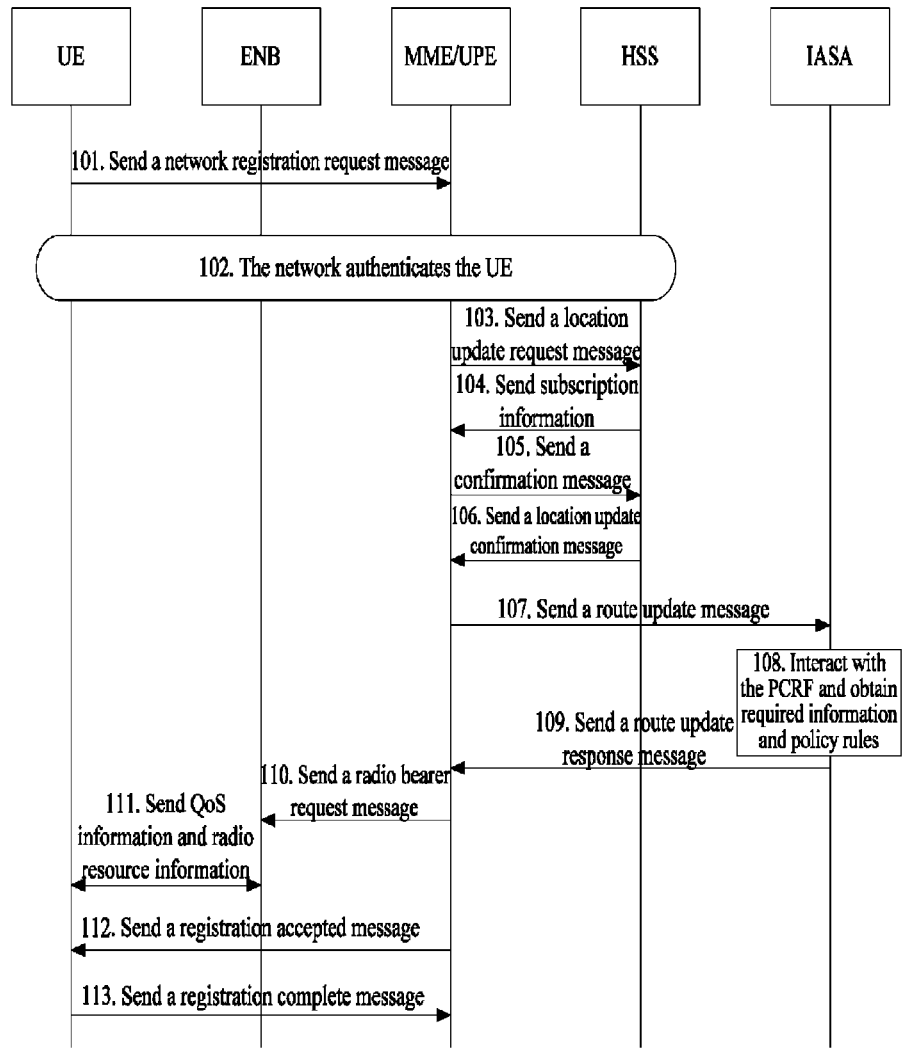
FIG. 1 is a flowchart of network registration in the conventional art.
Figure 2:
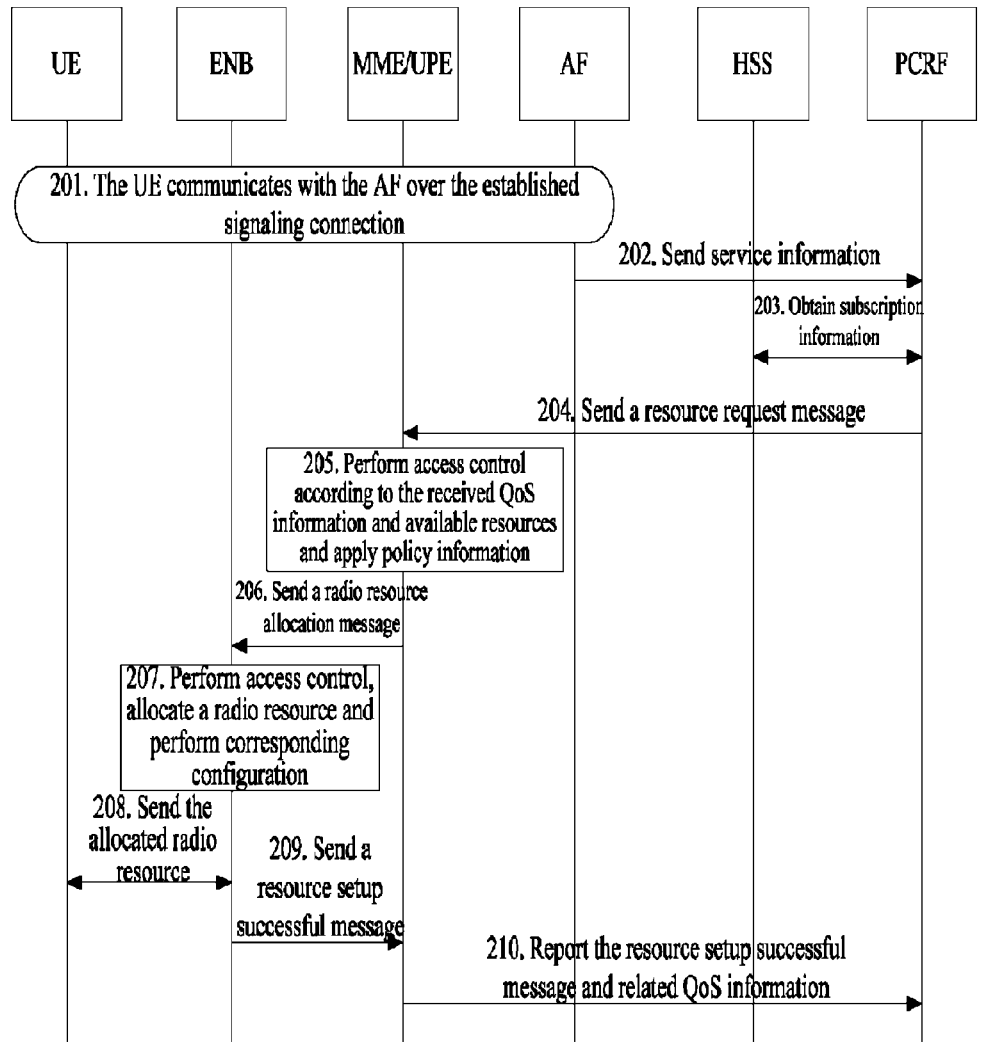
FIG. 2 is a flowchart of bearer setup in the conventional art.
Figure 3:
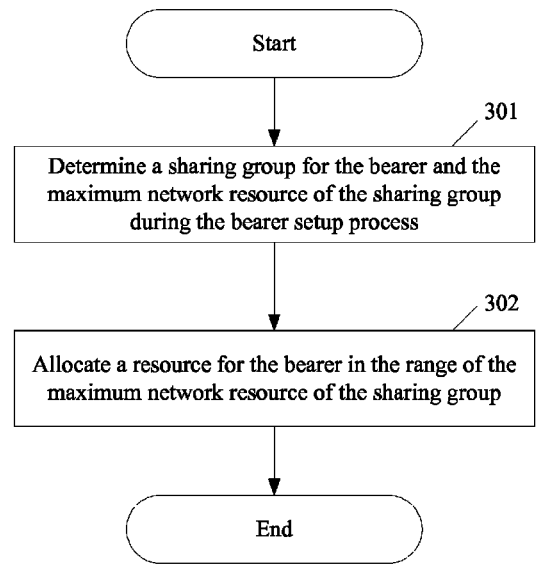
FIG. 3 is an exemplary flowchart of a method according to the first technical scheme of the present invention.

FIG. 3 is an exemplary flowchart of a method according to the first technical scheme of the present invention. In FIG. 3, the method includes the following steps: in step 301, determining a sharing group for a bearer and the maximum network resource of the sharing group in the bearer setup process; in step 302, allocating a resource for the bearer in the range of the maximum network resource of the sharing group.

Figure 4:
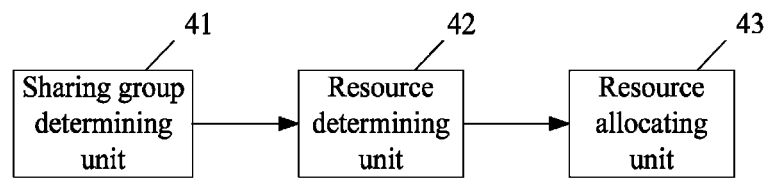
FIG. 4 is an exemplary structural diagram of an apparatus according to the first technical scheme of the present invention.

FIG. 4 is an exemplary flowchart of an apparatus according to the first technical scheme of the present invention. In FIG. 4, the apparatus includes a sharing group determining unit 41, a resource determining unit 42, and a resource allocating unit 43. The sharing group determining unit 41 is adapted to determine a sharing group for a bearer during the bearer setup process. The resource determining unit 42 is adapted to determine a corresponding maximum network resource according to the sharing group determined by the sharing group determining unit 41. The resource allocating unit 43 is adapted to allocate a network resource for the established bearer in the range of the maximum network resource of the sharing group. Allocating resources for multiple bearers in the same sharing group may be implemented according to the conventional art.

In the embodiments of the present invention, the sharing group can be set according to the service type corresponding to the current bearer. Then the maximum network resource is determined according to the service type corresponding to the sharing group and the total of network resources. The service type may be a service category or a service class. In the embodiments, labels, especially labels determined by the PCRF according to the service type corresponding to the bearer, may be used to identify service types.

A sharing group may correspond to multiple labels, that is, multiple service types, or correspond to only one label, that is, one service type. But a sharing group can correspond to only one maximum network resource. When a sharing group has only one bearer, the bearer may occupy the resource of the whole sharing group, that is, the maximum network resource. When a bearer is added to the sharing group, the network does not need to transfer resource information for the added bearer. The ENB just needs to allocate a maximum network resource dynamically for the bearers of the sharing group according to a certain resource allocation mechanism, thus implementing maximum utilization of network resources. The maximum network resource may be the Aggregate Maximum Bit Rate, AMBR, or Maximum Bit Rate, MBR, or Guaranteed Bit Rate, GBR. The sharing group may be set for individual UEs, or for multiple or all UEs.

In the wireless communication system, the ENB usually allocates a network resource during the bearer setup process. Therefore, to achieve the purposes of embodiments of the present invention, the ENB needs to know the sharing group corresponding to the current bearer and allocate a network resource for the bearer in the range of the maximum network resource of the sharing group. Generally, the subscription information related to users is stored in the HSS or SPR. Therefore, to let the ENB know the sharing group corresponding to the bearer, the ENB should be able to obtain the information related to the sharing group from the HSS or SPR.

The ENB may store the correspondence among the label, the sharing group identifier and the maximum network resource of the sharing group. Therefore, the ENB, through the label obtained by the PCRF and the correspondence among the three parties, determines the sharing group corresponding to the bearer and the maximum network resource, and allocates a network resource for the bearer in the range of the maximum network resource. The ENB may also store the correspondence between the sharing identifier and the maximum network resource of the sharing group. Therefore, the ENB determines the maximum network resource of the sharing group corresponding to the bearer by obtaining the sharing identifier through other network elements.

It can be seen through the preceding analysis that the determination of sharing groups corresponding to bears and the maximum network resource of sharing groups can be completed in the same network element or in different network elements.

In embodiments of the present invention, the maximum network resource is an AMBR and the service type is identified by a label. The AMBR value can be determined by operators.

The following describes the second technical scheme of the present invention.

Figure 5:
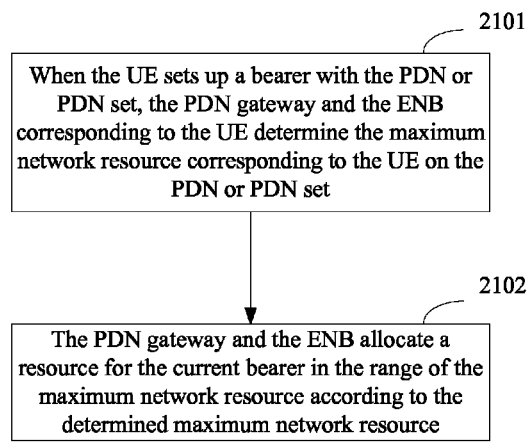
FIG. 5 is an exemplary flowchart of a method according to the second technical scheme of the present invention.

FIG. 5 is an exemplary flowchart of a method according to the second technical scheme of the present invention. The method includes setting a maximum network resource corresponding to a UE in a PDN or PDN set. When the UE sets up a bearer with the PDN or PDN set in step 2101, determining, by a PDN gateway and ENB that connect the UE and the PDN or PDN set, the maximum network resource corresponding to the UE on the PDN or PDN set. Step 2102: The PDN gateway and the ENB allocate a resource for the current bearer in the range of the maximum network resource according to the determined maximum network resource.

Figure 6:
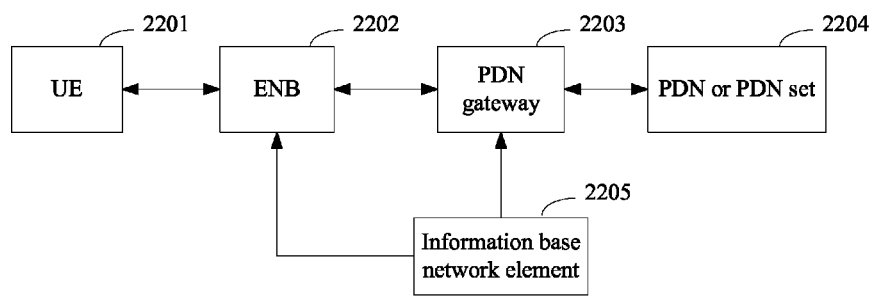
FIG. 6 is a structural diagram of a system according to the second technical scheme of the present invention.

FIG. 6 is a structural diagram of a system according to the second technical scheme of the present invention. The system includes at least a UE 2201, an ENB 2202, a PDN gateway 2203, and a PDN or PDN set 2204. The PDN gateway 2203 obtains the preset maximum network resource corresponding to the UE 2201 on the current PDN or PDN set 2204 when the UE 2201 and the PDN or PDN set 2204 connected to the PDN gateway set up a bearer, and allocates a resource for the current bearer in the range of the maximum network resource. When the UE 2201 sets up a bearer, the ENB 2202 obtains the preset maximum network resource corresponding to the UE 2201 on the current PDN or PDN set 2204, and allocates a resource for the current bearer in the range of the maximum network resource.

The system further includes an information base network element 2205. The information base network element 2205 provides the maximum network resource set on the PDN or PDN set 2204 for the UE 2201. The PDN gateway 2203 and the ENB 2202 obtain the maximum network resource of the UE 2201 on the PDN or PDN set 2204 from the information base network element 2205.

The maximum network resource herein may be the same as that in the first technical scheme. The following describes the technical scheme in a scenario where the maximum network resource is an AMBR. When the maximum network resource is of any other type, the implementation method for the AMBR may be used. In addition, the PDN set in this scenario includes multiple PDNs with the same IP address. That is, all PDNs with the same IP address share the same PDN-AMBR. IP addresses may also be different, but PDNs that the same UE belongs to form a PDN set and share an AMBR. In embodiments of the present invention, the AMBR occupied by the UE on the PDN or PDN set is called a PDN-AMBR.

The technical scheme of the present invention does not limit which bearers apply to the PDN-AMBR. They may be all bearers of the UE on the PDN or PDN set, including GBR bearers and non-GBR bearers. They may also be partial bearers, for example, all GBR bearers, or all non-GBR bearers, or partial GBR bearers or partial non-GBR bearers, or a combination of partial GBR bearers and partial non-GBR bearers, or other possible combinations of bearers.

The exemplary flowchart describes a method for the PDN gateway and the ENB that connect the UE and the PDN or PDN set to determine the maximum network resource corresponding to the UE on the PDN or PDN set when the UE sets up a bearer with the PDN or PDN set. The method may be implemented in the following modes.

In the first mode, the PDN-AMBR corresponding to the UE on the PDN or PDN set is stored in the HSS or SPR as the subscription data. When the PDN-AMBR is stored in the HSS or SPR as the subscription data, it can be obtained from the HSS and sent to the PDN gateway and the ENB through the MME, or obtained from the SPR and sent to the PDN gateway and the ENB through the PCRF. If the PDN-AMBR contained in the user's subscription information changes, the HSS or SPR sends the updated PDN-AMBR to corresponding network entities, for example, the PDN gateway and the ENB.

In the second mode, the PDN-AMBR corresponding to the UE on the PDN or PDN set is stored in the PDN gateway as a part of a static Policy and Charging Control, PCC, rule on the PDN gateway. When the PDN is activated, the MME or PCRF sends the identifier of the static PCC rule to the PDN gateway. The PDN gateway activates the corresponding PDN-AMBR for control according to the PCC rule stored in the PDN gateway. When the PCRFR sends the identifier of the PCC rule, the PDN gateway sends the determined PDN-AMBR to the ENB, and the ENB stores it and allocates a resource accordingly.

In the third mode, the PDN-AMBR is configured as static configuration data on corresponding network entities, for example, the PDN gateway and the ENB. When the PDN gateway and the ENB find that the first bearer of the UE on a PDN or PDN set is activated, the PDN gateway and the ENB take the PDN-AMBR corresponding to the UE on the PDN or PDN set as the threshold for flow control.

The PCRF and the SPR are functional entities in the PCC architecture. The PCC implements the policy and charging control based on the subscription information and updates the binding mechanism. Through the PCC architecture, operators may associate services with bearers of the services and implement complete policy control and charging based on service data flows. In the PCC architecture, the PCRF is the core functional entity. The PCRF establishes the policy and charging rules and implements control on service bearers by executing these rules. To establish required rules accurately, the PCRF can obtain information related to services from the AF, information related to user subscription from the SPR, and information related to bearers from the gateway. The PCEF is the entity that executes the rules established by the PCRF. It usually is located at the service gateway of a bearer network. In the technical scheme of the present invention, the PCEF is located at the PDN gateway.

Figure 7:
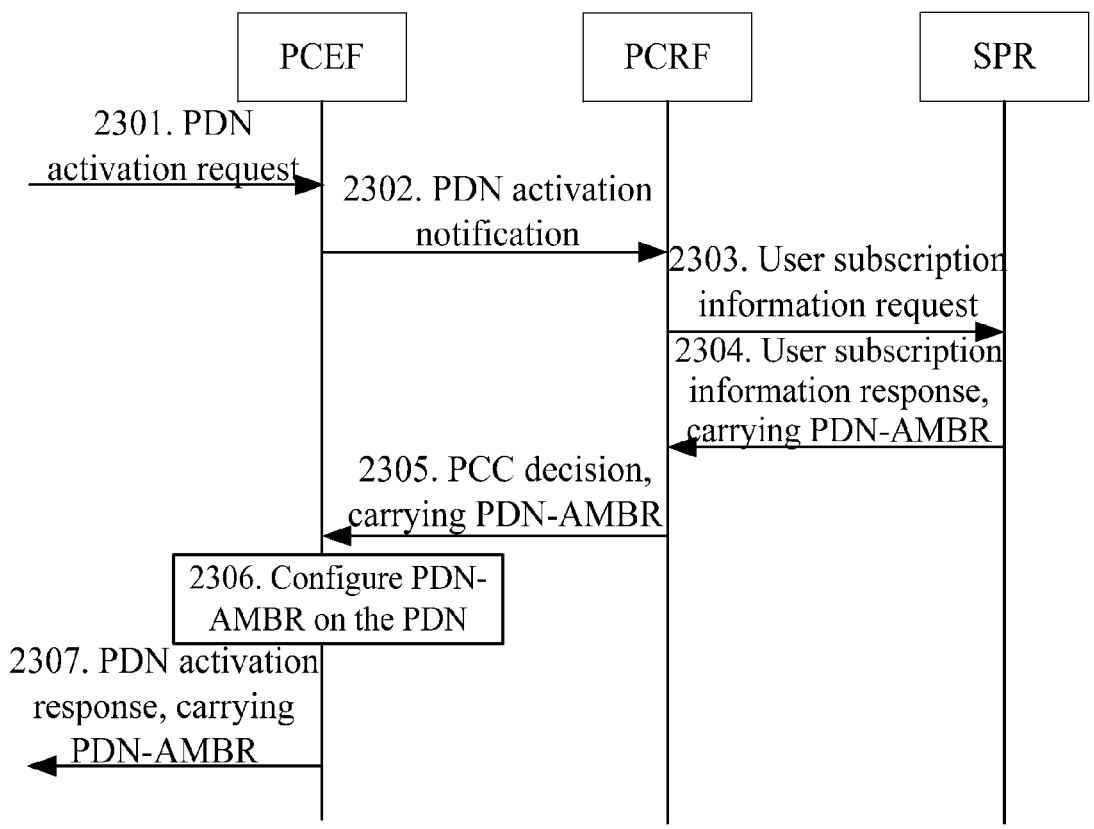
FIG. 7 is an exemplary flowchart of a method based on the PCC architecture according to an embodiment of the present invention.

FIG. 7 is an exemplary flowchart of a method based on the PCC architecture according to an embodiment of the present invention.

Step 2301: The PCEF receives a PDN activation request from the UE. The PDN activation request may be the first bearer setup request message for the PDN that the PDN gateway receives from the serving gateway, or other messages. The message also activates the setup of an IP Connectivity Access Network (IP-CAN) session of the PDN. The PCEF is located in the PDN gateway.

Step 2302: If the PCEF determines that the UE accesses the PDN for the first time, the PCEF sends a PDN activation notification to the PCRF. The PDN activation notification may be the policy and charging request message in the PCC or other messages. The message carries information related to the UE and the network. For example, the current PDN identifier is reported to the PCRF as the basis for decision making.

Step 2303: If the PCRF does not store the subscription information of the UE on the PDN, the PCRF requests the SPR for the subscription information. The request message contains information of the user identifier and the PDN identifier. If the PCRF stores the corresponding subscription information, the PCRF directly returns the subscription information.

Step 2304: The SPR returns the requested subscription information to the PCRF. The returned subscription information contains the PDN-AMBR information corresponding to the current PDN.

If the PCEF is configured with the corresponding PDN-AMBR information, the PCRF just activates the corresponding PCC decision on the PCEF, and the PDN-AMBR does not need to be transferred.

Step 2305: The PCRF makes decision on the policy and charging according to the obtained information and sends the obtained PCC rule to the PCEF through a corresponding PCC message. The message includes the PDN-AMBR information corresponding to the current PDN.

If the PCRF just activates the corresponding static PCC rule on the PCEF, a corresponding PCC rule identifier needs to be transferred. The PDN-AMBR information does not need to be transferred. In the technical scheme, the PDN-AMBR configured on the PCEF may also be activated by using other identifiers. Identifiers reflecting the PDN-AMBR such as the PCC rule identifiers are called sharing information.

Step 2306: The PCEF receives and executes the PCC rule. This step includes configuring the received PDN-AMBR on the PDN gateway and controlling the data flow of the UE on the PDN gateway. The corresponding PDN is activated and the process ends. Furthermore, the IP-CAN session of the PDN is established.

If the PCEF receives only one PCC decision or PCC rule identifier, the PCEF obtains the corresponding PDN-AMBR from the static PCC decision or PCC rule.

Step 2307: The PCEF sends a response message to the network entity that sends the PDN activation request. The message may carry corresponding PDN-AMBR information.

In the preceding process, the PCEF is located at the PDN gateway. One PDN gateway can provide access to one or multiple PDNs. All PDNs can be activated through the preceding method for the PDN-AMBR. The preceding process is applicable to any IP-CAN based on the PCC architecture. The following describes the technical scheme in specific application scenarios with reference to the first, second, and third embodiments.

Figure 8:
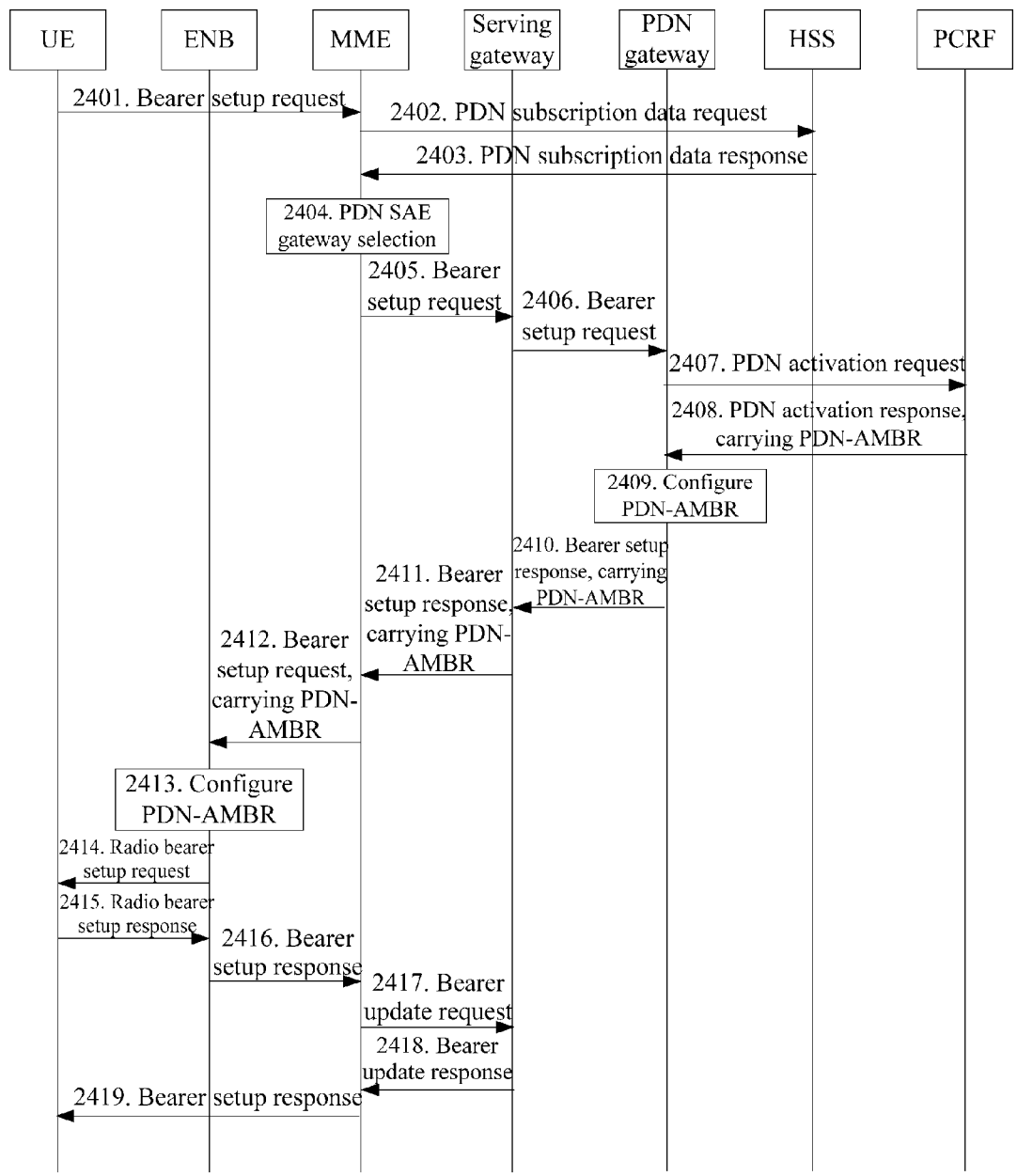
FIG. 8 is a flowchart of a method according to the first embodiment of the present invention.

FIG. 8 is a flowchart of a method according to the first embodiment of the present invention. In the process of the embodiment, the PDN gateway obtains the PDN-AMBR corresponding to the current bearer from the PCRF and sends it to the ENB. The process includes:

Step 2401: The UE sends a bearer setup request to the MME.

Step 2402: The MME sends a PDN subscription data request to the HSS.

Step 2403: The HSS returns a PDN subscription data response to the MME.

Step 2404: The MME selects the serving gateway and the PDN gateway.

Step 2405: The MME sends a bearer setup request to the corresponding serving gateway.

Step 2406: The serving gateway receives the bearer setup request sent by the MME and sends a bearer setup request to the PDN gateway selected by the MME.

Step 2407: The PDN gateway sends a PDN activation request to the PCRF.

Step 2408: The PCRF returns a PDN activation response to the PDN gateway. In the PCC architecture, the PCRF returns the PDN activation response to the PCEF in the PDN gateway. The response carries the PDN-AMBR.

The PCRF determines the PDN-AMBR corresponding to the current bearer established by the UE according to the UE related information in the received PDN activation request and information related to the PDN or PDN set when the PCRF stores the PDN-AMBR of the PDN or PDN set corresponding to the UE, and sends the PDN-AMBR to the PDN gateway. Or, the PCRF obtains the PDN-AMBR corresponding to the current bearer established by the UE from the SPR connected to the PCRF if the PCRF does not store the PDN-AMBR of the PDN or PDN set corresponding to the UE. The SPR, as the subscription profile repository of the UE under the PCC architecture, stores the PDN-AMBR of the UE when the PCRF does not store the PDN-AMBR of the UE. For details, refer to the process in FIG. 7.

Step 2409: The PDN gateway configures the PDN-AMBR on the PDN gateway and allocates a resource for the current bearer in the range of the PDN-AMBR.

Step 2410: The PDN gateway sends the PDN-AMBR to the serving gateway through the bearer setup response message.

Step 2411: The serving gateway sends the PDN-AMBR to the MME through the bearer setup response message.

Step 2412: The MME sends the received PDN-AMBR to the ENB.

Step 2413: The ENB configures the received PDN-MBR information and allocates a resource for the current bearer in the range of the PDN-AMBR.

Step 2414: The ENB sends a radio bearer setup request to the UE.

Step 2415: The UE returns a radio bearer setup response to the ENB.

Step 2416: The ENB returns a bearer setup response to the MME.

Step 2417: The MME sends a bearer update request to the serving gateway.

Step 2418: The serving gateway returns a bearer update response to the MME.

Step 2419: The MME sends a bearer setup response to the UE.

Steps related to the bearer setup in the process may be standard steps.

Figure 9:
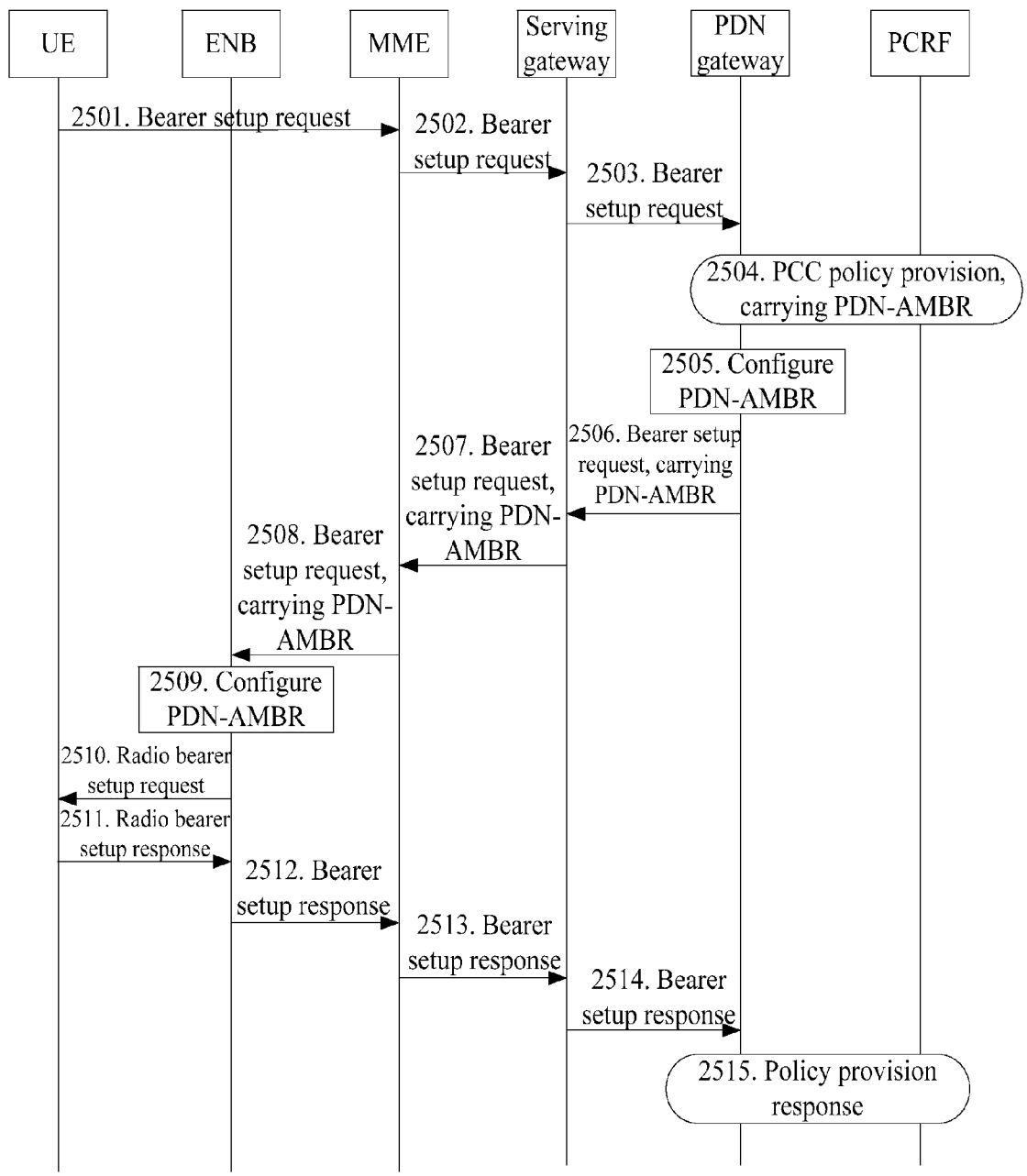
FIG. 9 is a flowchart of a method according to the second embodiment of the present invention.

FIG. 9 is a flowchart of a method according to the second embodiment of the present invention. In the process of the embodiment, the PDN gateway obtains the PDN-AMBR corresponding to the current bearer from the PCRF and sends it to the ENB.

The process includes:

Steps 2501-2503: The UE sends a bearer setup request to the PDN gateway through the MME and the serving gateway.

Step 2504: The PDN gateway interacts with the PCRF. The PCRF provides a PCC policy for the PDN gateway, where the policy carries the PDN-AMBR. The PCRF may obtain the PDN-AMBR corresponding to the current bearer with reference to step 2408.

If the PCRF stores the corresponding PDN-AMBR, it sends the stored PDN-AMBR directly to the PDN gateway. If the PCRF does not store the corresponding PDN-AMBR, the PCRF interacts with the SPR and obtains the PDN-AMBR, and sends a PCC policy carrying the PDN-AMBR to the PDN gateway.

For the process in which the PCRF obtains the PDN-AMBR, refer to FIG. 7.

Step 2505: The PDN gateway stores and configures the received PDN-AMBR and allocates a resource for the current bearer in the range of the PDN-AMBR.

Step 2506: The PDN gateway sends the bearer setup request carrying the PDN-AMBR to the serving gateway.

Step 2507: The serving gateway sends the bearer setup request carrying the PDN-AMBR to the MME.

Step 2508: The MME sends the bearer setup request to the ENB, and thus sends the PDN-AMBR to the ENB.

Step 2509: The ENB stores and configures the received PDN-AMBR and allocates a resource for the current bearer in the range of the PDN-AMBR.

Step 2510: The ENB sends a radio bearer setup request to the UE.

Step 2511: The UE returns a radio bearer setup response to the ENB.

Step 2512: The ENB sends a bearer setup response to the MME.

Step 2513: The MME sends the bearer setup response to the serving gateway.

Step 2514: The serving gateway sends the bearer setup response to the PDN gateway.

Step 2515: The PDN gateway returns a policy provision response to the PCRF.

Steps 2510 to 2515 are dedicated bearer setup processes. Relevant processes can be referred to in the conventional art.

Figure 10:
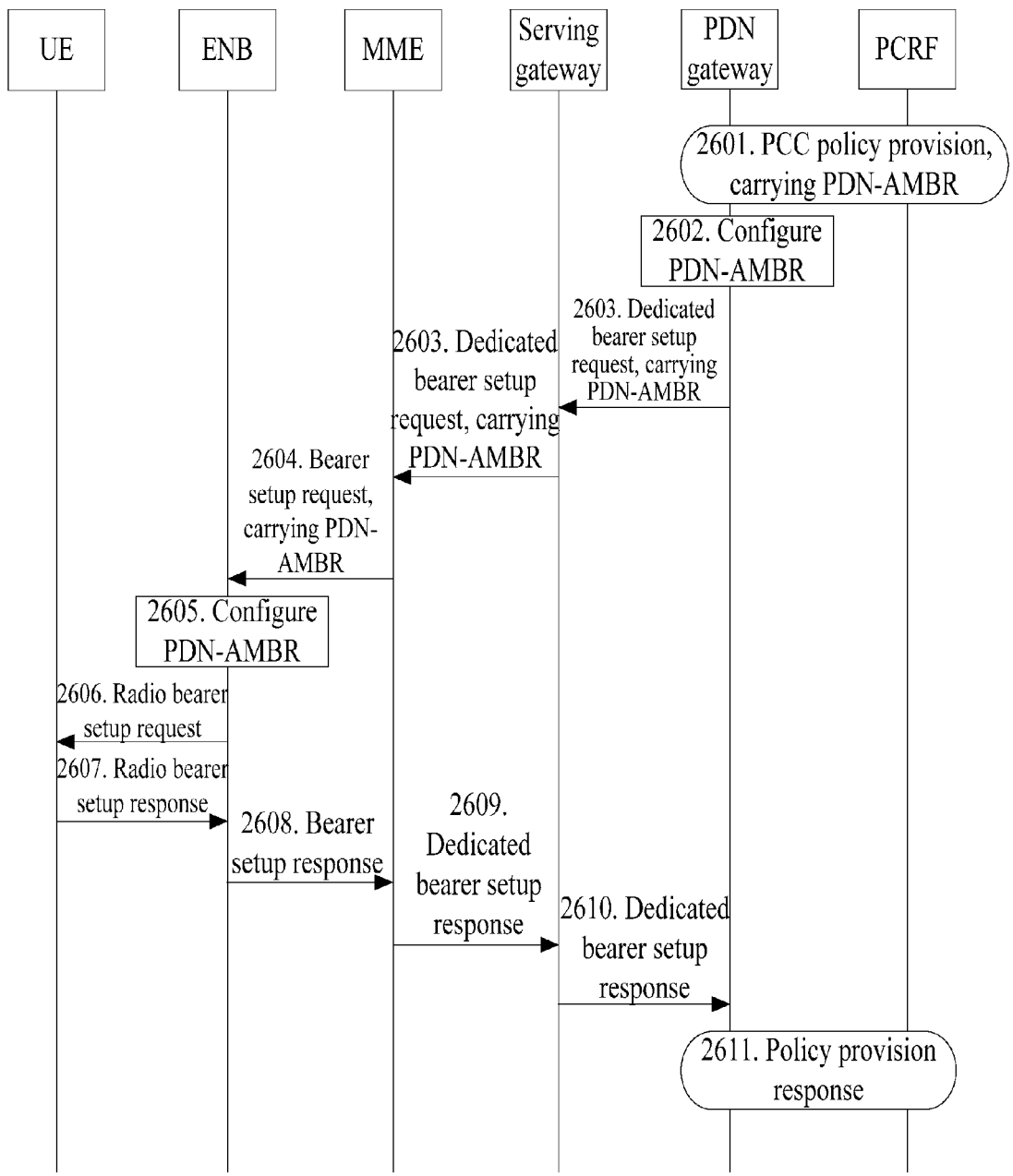
FIG. 10 is a flowchart of a method according to the third embodiment of the present invention.

FIG. 10 is a flowchart of a method according to the third embodiment of the present invention. In the process of the embodiment, the PDN gateway obtains the PDN-AMBR corresponding to the current bearer from the PCRF and sends it to the ENB. The process includes:

Step 2601: The PCRF interacts with the PDN gateway and provides a PCC policy for the PDN gateway connecting the UE and the PDN or PDN set according to the PDN or PDN set corresponding to the bearer to be established by the UE. The PCC policy carries the PDN-AMBR. The PCRF may obtain the PDN-AMBR corresponding to the current bearer with reference to step 2408.

If the PCRF stores the corresponding PDN-AMBR, it sends the stored PDN-AMBR directly to the PDN gateway. If the PCRF does not store the corresponding PDN-AMBR, the PCRF interacts with the SPR and obtains the PDN-AMBR, and sends a PCC policy carrying the PDN-AMBR to the PDN gateway.

Steps 2602 to 2611 are the same as steps 2505 to 2515.

When the first bearer of a PDN or PDN set is activated, the PDN-AMBR is applied in the data flow control for the subsequent bearers. The control includes: (1) identifying whether the new bearer is in the control range of a certain PDN-AMBR; (2) allocating a bandwidth resource for the new bearer according to the PAlDN-AMBR value and the flow of existing bearers; and (3) controlling the flow rate of all bearers in the control range according to the PDN-AMBR. Identifying whether the new bearer is in the control range of a certain PDN-AMBR is to configure a corresponding PDN-AMBR for non-first bearers. There are two implementation solutions.

The first solution is: the sharing identifier information of any bearer established by the UE on the PDN or PDN set is obtained according to the PDN corresponding to the bearer established by the UE. The PDN gateway and the ENB determine the PDN-AMBR of the new bearer according to the sharing identifier information, and allocate resources for the new bearer and other bearers in the range of the maximum network resource. The sharing identifier information may be the bearer identifier of any bearer established on the PDN or PDN set corresponding to the bearer, for example, the linked EPS bearer ID, or be a PDN network identifier, for example, an access point name, or be any other identifier that can identify which PDN the bearer belongs to. The PDN gateway and the ENB determine the control range of the PDN-AMBR that the bearer belongs to according to the received identifiers of established bearers or other identifiers that can identify which PDN or PDN set the bearer belongs to, and allocate corresponding PDN-AMBR resources.

The second solution is: the sharing identifier information is set according to the maximum network resource corresponding to the UE when the UE sets up the first bearer, and sent to the PDN gateway and the ENB. The PDN gateway and the ENB establish the correspondence between the sharing identifier information and the maximum network resource of the UE. The PDN gateway and the ENB determine the maximum network resource corresponding to the UE according to the established correspondence between the sharing identifier information and the maximum network resource of the UE and the received sharing identifier information, and allocate resources for the new bearer and other established bearers in the range of the maximum network resource. Specifically, a mapping table can be set on the node that uses the PDN-AMBR for flow control, including PDN-AMBR sharing identifier and corresponding PDN-AMBR values. In the setup of subsequent bearers, the sharing identifier may be carried in the bearer setup requests to notify the node of corresponding PDN-AMBR values.

Figure 11:
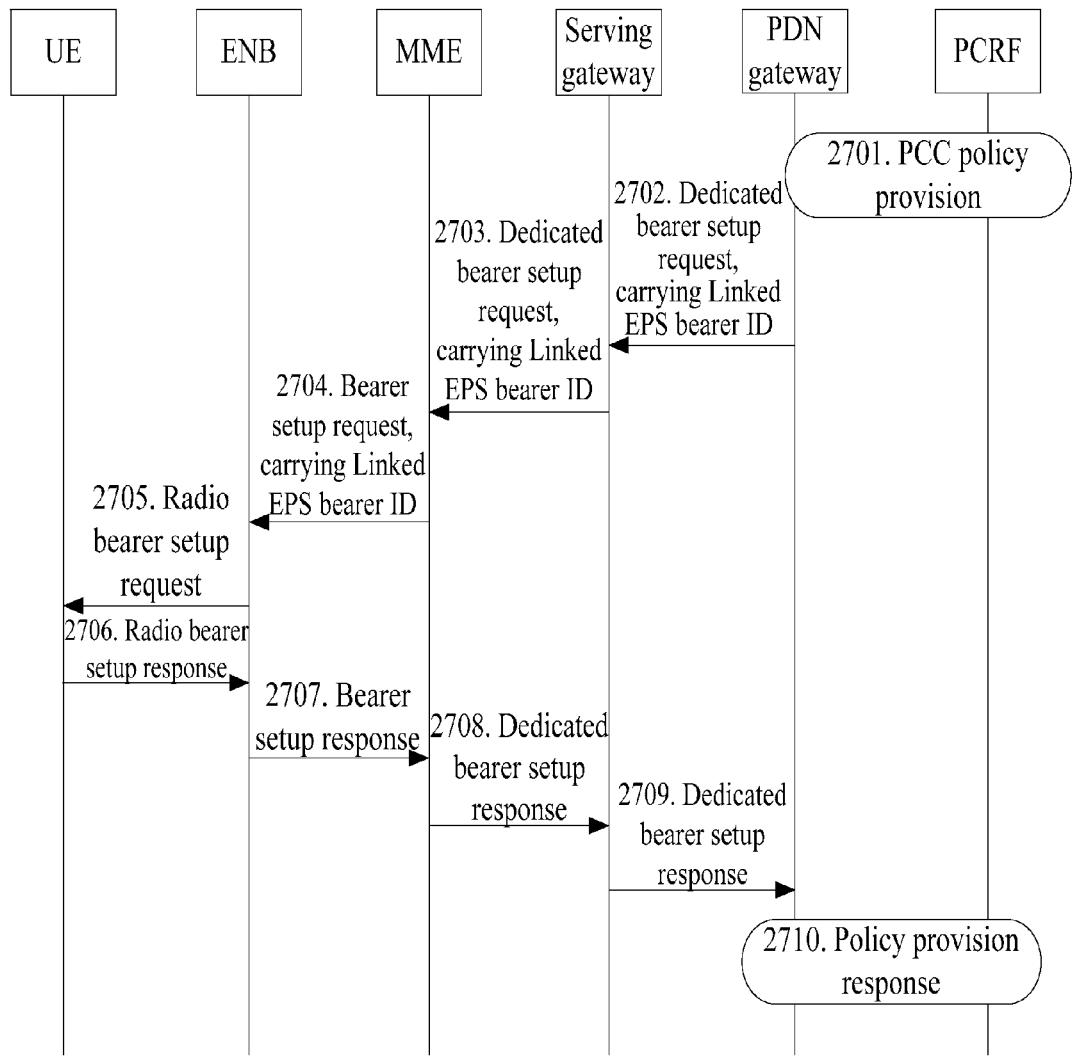
FIG. 11 is a flowchart of setting up a non-first bearer according to an embodiment of the present invention.

FIG. 11 is a flowchart of setting up a non-first bearer according to an embodiment of the present invention.

Step 2701: The PCRF interacts with the PDN gateway and provides a PCC policy for the PDN gateway connecting the UE and the PDN or PDN set according to the PDN or PDN set corresponding to the bearer to be established.

Step 2702: The PDN gateway determines the PDN-AMBR corresponding to the UE on the PDN or PDN set according to the policy provided by the PCRF, and allocates resources for the bearers of the UE on the PDN or PDN set, including the current bearer and other established bearers. The PDN gateway sends a dedicated bearer setup request to the serving gateway, in which the linked EPS bearer ID of an established bearer in the range of the current PDN-AMBR is carried. This process takes the linked EPS bearer ID as an example. When the sharing identifier information is other contents, this process may also be applied.

Step 2703: The serving gateway sends the dedicated bearer setup request carrying the linked EPS bearer ID to the MME.

Step 2704: The MME sends the bearer setup request carrying the linked EPS bearer ID to the ENB.

Step 2705: The ENB finds the PDN-AMBR corresponding to the current bearer according to the received linked EPS bearer ID, allocates resources for the bearers, including the current bearer and other established bearers, of the UE on the PDN or PDN set, and sends a radio bearer setup request to the UE.

Steps 2706 to 2710 are similar to steps 2511 to 2515.

The process shown in FIG. 11 is applicable to the first, second, and third embodiments based on the PCC architecture.

The processes of the first, second, and third embodiments based on the PCC architecture are applicable to scenarios where corresponding PDNs are configured with PCC in an Evolved Packet system, EPS. If the PCC is not configured, the configuration of PDN-AMBR depends on implementations of IP-CANs.

Figure 12:
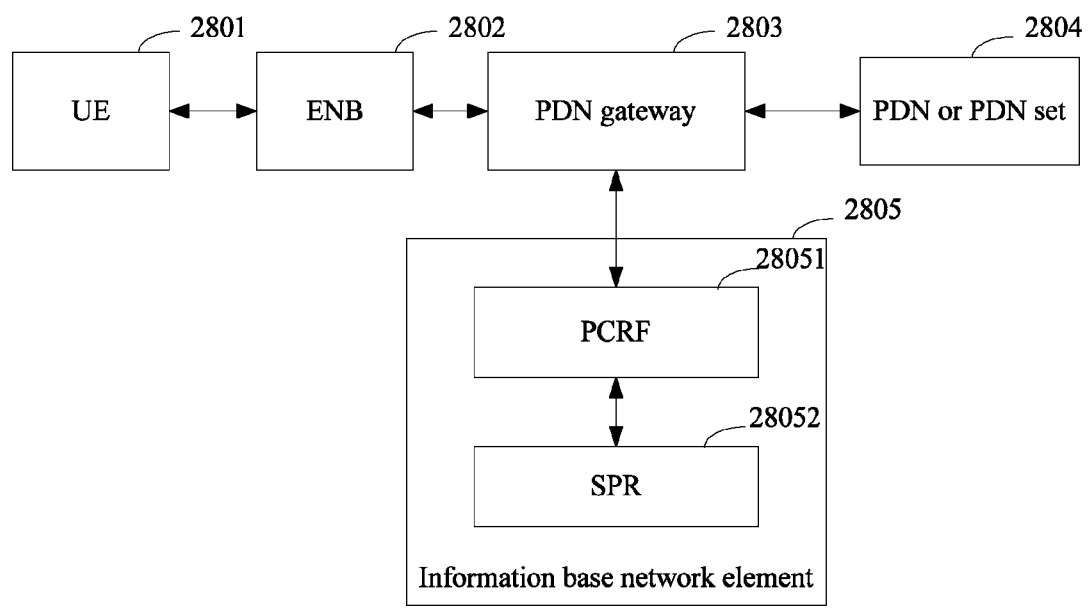
FIG. 12 is a structural diagram of a system according to the second technical scheme of the present invention.

FIG. 12 is a structural diagram of a system according to the second technical scheme of the present invention. The system is the same as that shown in FIG. 6, including a UE 2801, an ENB 2802, a PDN gateway 2803, a PDN or PDN set 2804, and an information base network element 2805. In the structural diagram, the ENB 2802 obtains the maximum network resource through the PDN gateway 2803. The information base network element 2805 includes a PCRF 28051 and an SPR 28052. If the PCRF 28051 stores sharing information reflecting the maximum network resource, the PCRF 28051 sends the sharing information reflecting the maximum network resource corresponding to the UE 2801 on the PDN or PDN set 2804 to the PDN gateway 2803. If the PCRF 28051 does not store the maximum network resources, but the SPR 28052 stores the sharing information reflecting the maximum network resources, the PCRF 28051 obtains the sharing information reflecting the maximum network resource corresponding to the UE 2801 on the PDN or PDN set 2804 from the SPR 28052, and sends the information to the PDN gateway 2803. The PDN gateway 2803 and the ENB 2802 may determine the maximum network resource with reference to the methods shown in FIG. 7 to FIG. 11.

Figure 13:
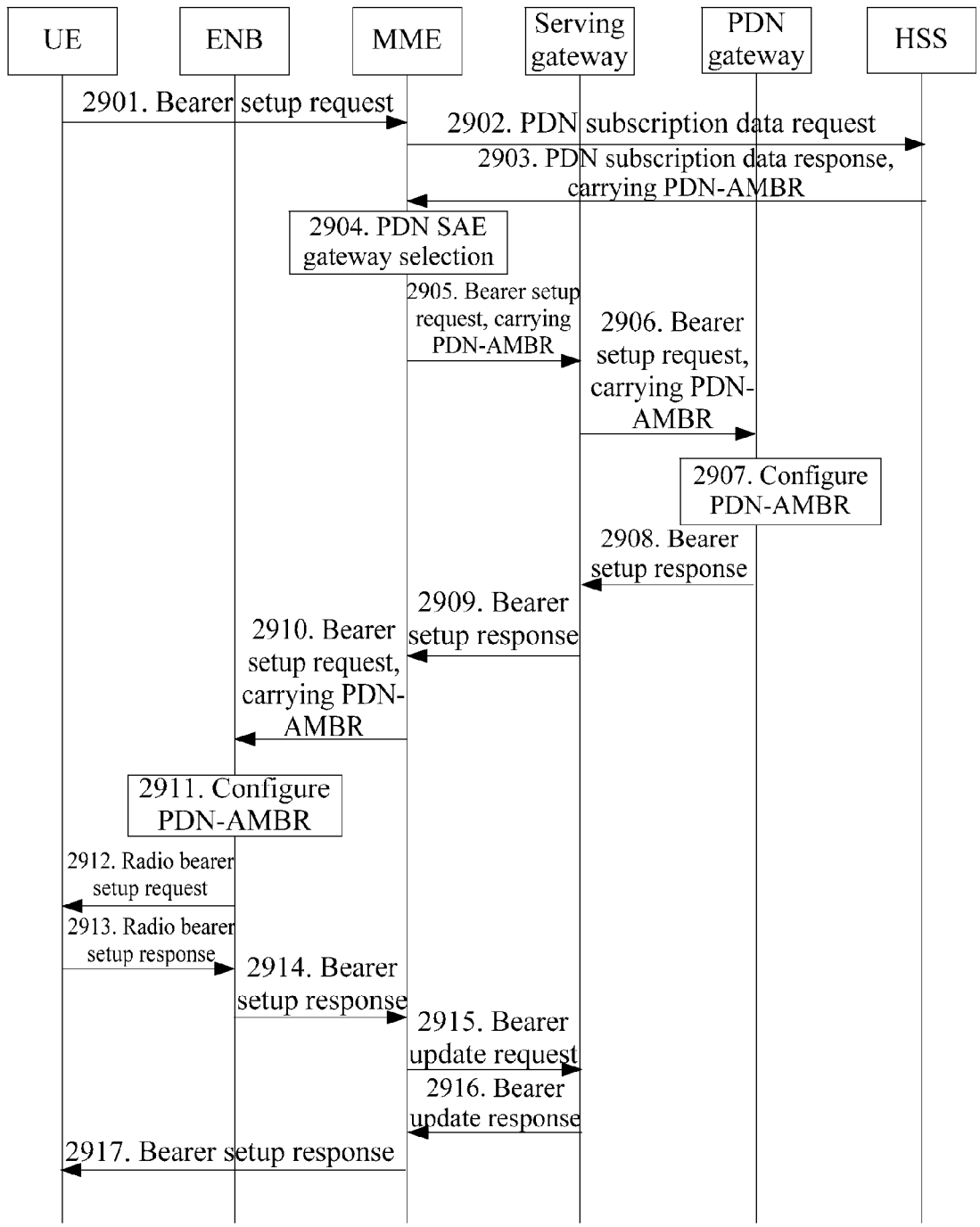
FIG. 13 is a flowchart of a method according to the fourth embodiment of the present invention.

FIG. 13 is a flowchart of a method according to the fourth embodiment of the present invention.

Step 2901: The UE sends a bearer setup request to the MME.

Step 2902: The MME sends a PDN subscription data request to the HSS.

Step 3903: The HSS returns a PDN subscription data response to the MME. The response carries the PDN-AMBR of the PDN corresponding to the bearer to be established by the UE. The HSS pre-stores the PDN-AMBR of each PDN or PDN set corresponding to the UE, and determines the corresponding PDN-AMBR according to the PDN or PDN set corresponding to the current bearer.

Step 2904: The MME selects the serving gateway and the PDN gateway.

Step 2905: The MME sends the bearer setup request carrying the PDN-AMBR to the serving gateway.

Step 2906: The serving gateway sends the bearer setup request carrying the PDN-AMBR to the PDN gateway.

Step 2907: The PDN gateway configures the received PDN-MBR and allocates a resource for the current bearer in the range of the PDN-AMBR.

Step 2908: The PDN gateway sends a bearer setup response to the serving gateway.

Step 2909: The serving gateway returns a bearer setup response to the MME.

Step 2910: The MME sends the bearer setup request carrying the PDN-AMBR to the ENB.

Step 2911: The ENB configures the received PDN-AMBR and allocates a resource for the current bearer in the range of the PDN-AMBR.

Step 2912: The ENB sends a radio bearer setup request to the UE.

Step 2913: The UE returns a radio bearer setup response to the ENB.

Step 2914: The ENB returns a bearer setup response to the MME.

Step 2915: The MME sends a bearer update request to the serving gateway.

Step 2916: The serving gateway returns a bearer update response to the MME.

Step 2917: The MME sends a bearer setup response to the UE.

The method for the MME to obtain the PDN-AMBR from the HSS in this embodiment may be implemented in another way. When the UE sets up a bearer through the MME for the first time or performs network registration, the MME obtains and stores the PDN-AMBR corresponding to the UE on each PDN or PDN set, and sends the PDN-AMBR of the current bearer to the PDN gateway and the ENB. When the UE sets up bearers through the MME with other PDNs or PDN sets, the MME can directly select the PDN-AMBR on the PDN or PDN set corresponding to the current bearer from the PDN-AMBRs corresponding to the UE stored in the MME, and send the PDN-AMBR to the PDN gateway and the ENB.

Figure 14:
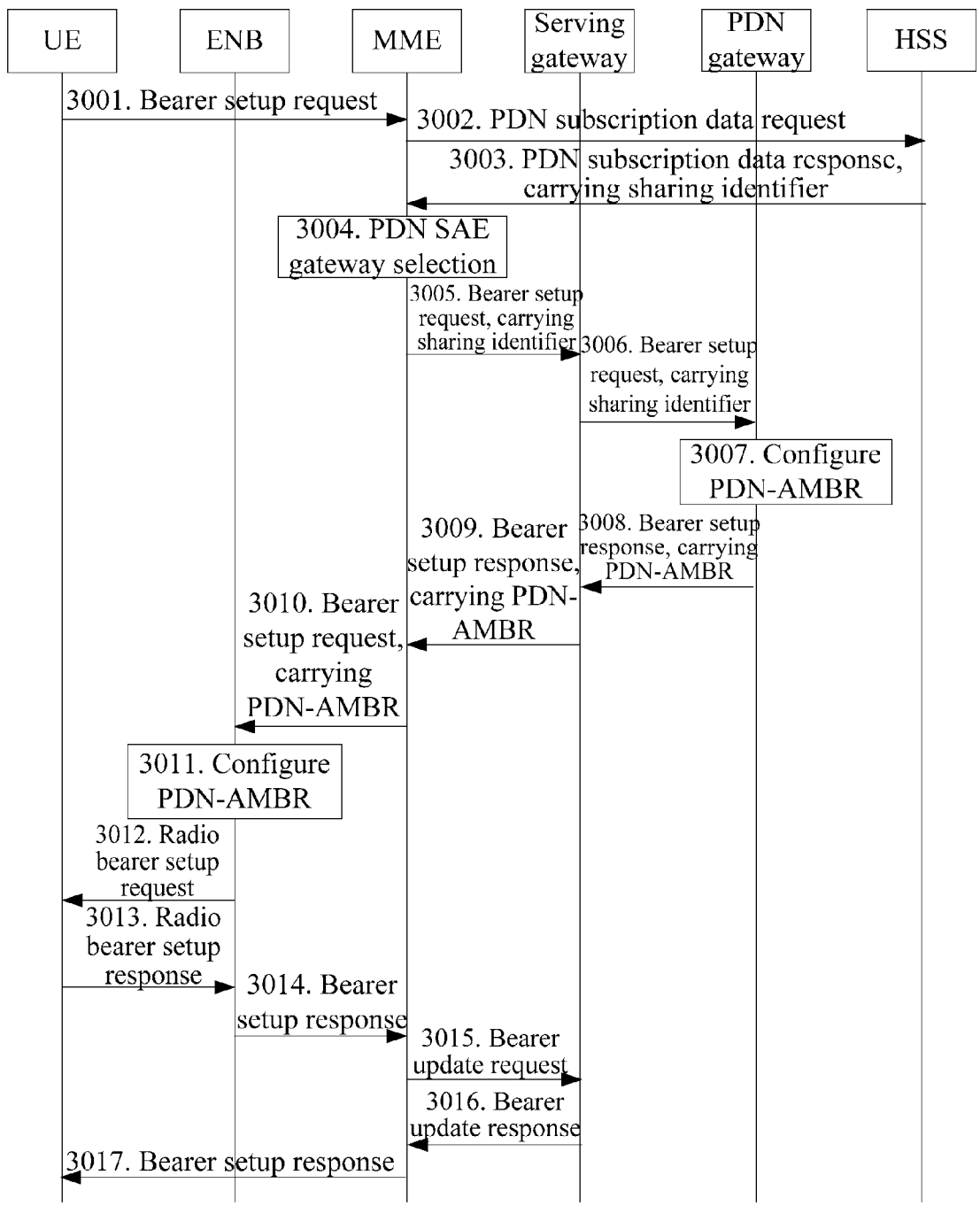
FIG. 14 is a flowchart of a method according to the fifth embodiment of the invention.

FIG. 14 is a flowchart of a method according to the fifth embodiment of the invention. FIG. 14 shows a non-PCC architecture and a method for obtaining the sharing identifier corresponding to the PDN-AMBR from the HSS in a first bearer setup process. In the embodiment, the PDN gateway stores the PDN-AMBR corresponding to the UE on each PDN or PDN set and the sharing identifier of the PDN-AMBR. The HSS stores the sharing identifier corresponding to the UE on each PDN or PDN set. The specific process of this embodiment is as follows:

Step 3001: The UE sends a bearer setup request to the MME.

Step 3002: The MME sends a PDN subscription data request to the HSS.

Step 3903: The HSS returns a PDN subscription data response to the MME. The response carries the sharing identifier of the PDN-AMBR of the PDN corresponding to the bearer to be established by the UE. The HSS determines the sharing identifier according to the PDN or PDN set corresponding to the bearer to be established by the UE.

Step 3004: The MME selects the serving gateway and the PDN gateway.

Step 3005: The MME sends the bearer setup request carrying the sharing identifier to the serving gateway.

Step 3006: The serving gateway sends the bearer setup request carrying the sharing identifier to the PDN gateway.

Step 3007: The PDN gateway determines the PDN-AMBR corresponding to the current bearer according to the stored correspondence between the PDN-AMBR and the sharing identifier, configures the PDN-AMBR, and allocates a source for the bearer in the range of the PDN-AMBR.

Step 3008: The PDN gateway returns a bearer setup response carrying the PDN-AMBR to the serving gateway.

Step 3009: The serving gateway returns the bearer setup response carrying the PDN-AMBR to the MME.

Step 3010: The MME sends the bearer setup request carrying the PDN-AMBR to the ENB.

Step 3011: The ENB configures the received PDN-AMBR and allocates a resource for the current bearer in the range of the PDN-AMBR.

Step 3012: The ENB sends a radio bearer setup request to the UE.

Step 3013: The UE returns a radio bearer setup response to the ENB.

Step 3014: The ENB returns a bearer setup response to the MME.

Step 3015: The MME sends a bearer update request to the serving gateway.

Step 3016: The serving gateway returns a bearer update response to the MME.

Step 3017: The MME sends a bearer setup response to the UE.

The processes shown in FIG. 13 and FIG. 14 are also applicable to the bearer setup process based on the PCC architecture.

Figure 15:
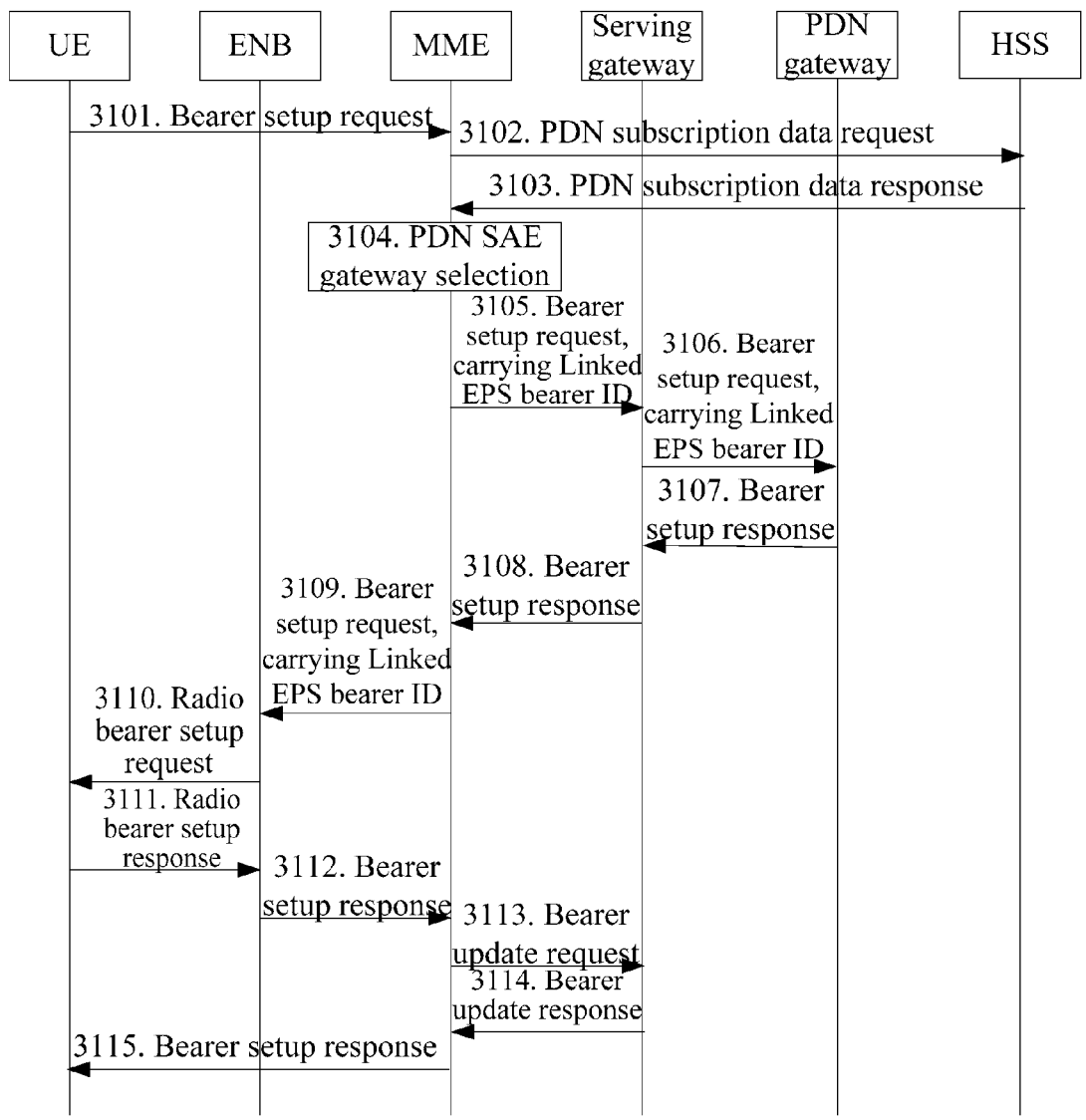
FIG. 15 is another flowchart of setting up a non-first bearer according to an embodiment of the present invention.

FIG. 15 is another flowchart of setting up a non-first bearer according to an embodiment of the present invention.

Step 3101: The UE sends a bearer setup request to the MME.

Step 3102: The MME sends a PDN subscription data request to the HSS.

Step 3103: The HSS returns a PDN subscription data response to the MME.

Step 3104: The MME selects the serving gateway and the PDN gateway.

Step 3105: The MME sends the bearer setup request carrying the linked EPS bearer ID to the serving gateway. This process takes the linked EPS bearer identifier as an example. When the sharing identifier information is other contents, this process may also be applied. The method for determining the sharing identifier information in this process is the same as that shown in FIG. 11.

Step 3106: The serving gateway sends the bearer setup request carrying the linked EPS bearer ID to the PDN gateway.

Step 3107: The PDN gateway finds the PDN-AMBR corresponding to the current bearer according to the received linked EPS bearer ID, allocates resources for the bearers, including the current bearer and other established bearers, of the UE on the PDN or PDN set, and sends a radio bearer setup response to the serving gateway.

Step 3108: The serving gateway returns a bearer setup response to the MME.

Step 3109: The MME sends the bearer setup request carrying the linked EPS bearer identifier to the ENB.

Step 3110: The ENB finds the PDN-AMBR corresponding to the current bearer according to the received linked EPS bearer ID, allocates resources for the bearers, including the current bearer and other established bearers, of the UE on the PDN or PDN set, and sends a radio bearer setup request to the UE.

Steps 3111 to 3115 are the same as steps 2912 to 2917.

FIG. 8 to FIG. 15 describe the processes in which the PCRF or MME directly obtains the PDN-AMBR, that is, the first method for the PDN gateway and the ENB to determine the PDN-AMBR. The second method and third method for the PDN gateway and the ENB to determine the PDN-AMBR are also applicable to the preceding processes. In the second method, the PCRF, HSS or MME sends the sharing information reflecting the PDN-AMBR instead of the PDN-AMBR. In the third method, the PCRF, HSS or MME does not transfer information related to the PDN-AMBR, but determines the PDN-AMBR corresponding to the current bearer according to the PDN-AMBR corresponding to the UE stored in the PDN gateway and the ENB and the information of the PDN or PDN set corresponding to the UE and the current bearer carried in the received messages.

In the second technical scheme of the present invention, the PDN-AMBR on the PDN gateway and the ENB may be configured with uplink and downlink values. Or the PDN-AMBR on the PDN gateway is configured with a downlink value, and the PDN-AMBR on the ENB is configured with both downlink and uplink values. Or the PDN-AMBR on the PDN gateway is configured with a downlink value, and the PDN-AMBR on the ENB is configured with an uplink value. Or other combinations of PDN-AMBR uplink and downlink values are configured on the PDN gateway and the ENB.

Figure 16:
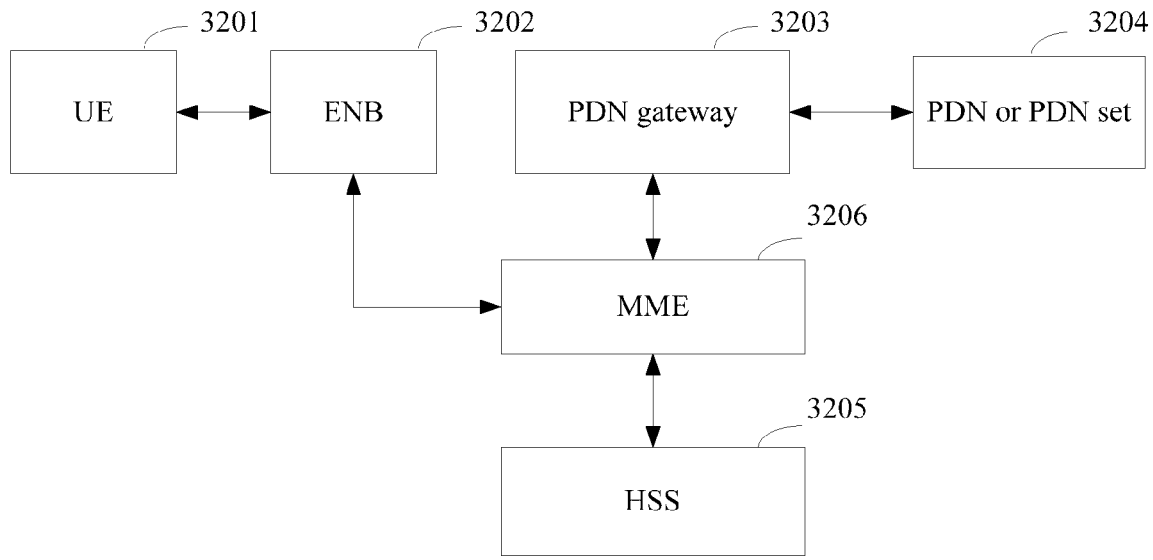
FIG. 16 is a structural diagram of another system according to the second technical scheme of the present invention.

FIG. 16 is a structural diagram of another system according to the second technical scheme of the present invention. The system is the same as that shown in FIG. 6, including a UE 3201, an ENB 3202, a PDN gateway 3203, a PDN or PDN set 3204, and an information base network element. The information base network element in this system is an HSS 3205. The system further includes an MME 3206. In the system, the MME 3206 obtains the PDN-AMBR corresponding to the current PDN or PDN set from the HSS 3205, and sends the PDN-AMBR to the PDN gateway 3203 and the ENB 3202. The PDN gateway 3203 and the ENB 3202 may determine the maximum network resource with reference to the method shown in FIG. 13.

Figure 17:
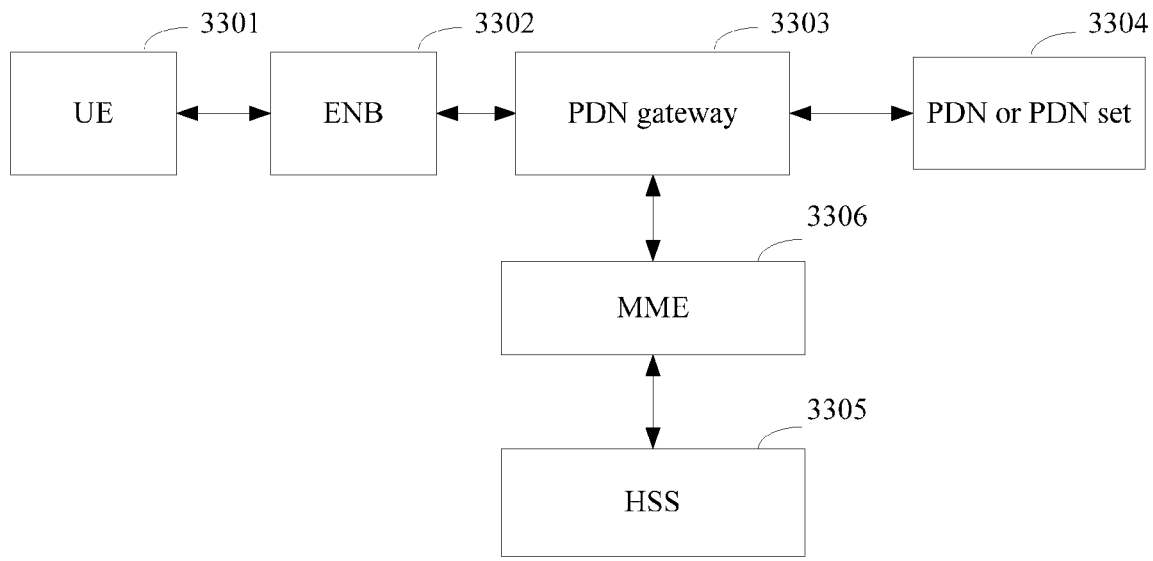
FIG. 17 is a structural diagram of another system according to the second technical scheme of the present invention.

FIG. 17 is a structural diagram of another system according to the second technical scheme of the present invention. The system is the same as that shown in FIG. 6, including a UE 3301, an ENB 3302, a PDN gateway 3303, a PDN or PDN set 3304, and an information base network element. The information base network element in this system is an HSS 3305. Accordingly, the system further includes an MME 3306. The MME 3306 obtains the sharing identifier of the PDN-AMBR corresponding to the current PDN or PDN set from the HSS 3305, and sends the sharing identifier to the PDN gateway 3303. The PDN gateway 3303 obtains the PDN-AMBR corresponding to the received sharing identifier according to the correspondence between the stored PDN-AMBR and the sharing identifier, and sends the PDN-AMBR to the ENB 3302. Thus both the PDN gateway 3303 and the ENB 3302 obtain the PDN-AMBR corresponding to the current bearer. The PDN gateway 3303 and the ENB 3302 may determine the maximum network resource with reference to the method shown in FIG. 14.

Figure 18:
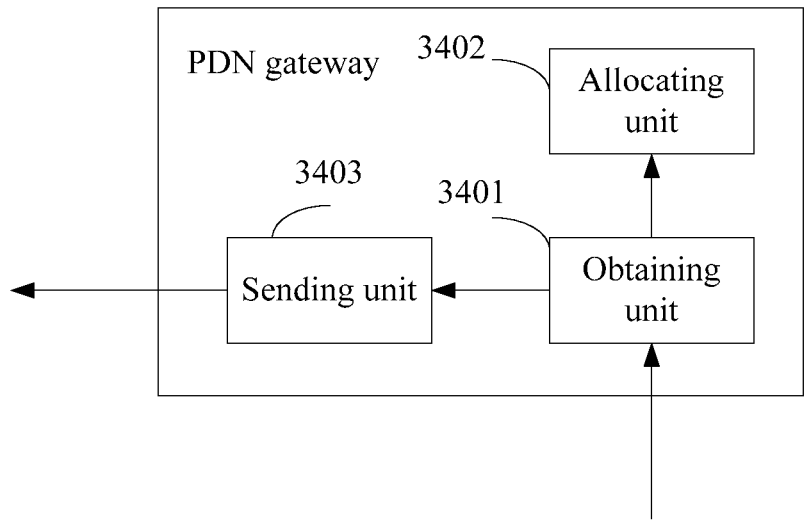
FIG. 18 is a structural diagram of a PDN gateway according to the second technical scheme of the present invention.

In addition, the internal structure of the PDN gateway in FIG. 6, FIG. 12, FIG. 16, and FIG. 17 may be the same as that shown in FIG. 18. As shown in FIG. 18, the PDN gateway includes at least an obtaining unit 3401 and an allocating unit 3402. When the UE and the PDN or PDN set connected to the PDN gateway set up a bearer, the obtaining unit 3401 obtains the preset maximum network resource corresponding to the UE on the current PDN or PDN set, and sends the maximum network resource to the allocating unit 3402. The allocating unit 3402 receives the maximum network resource and allocates a resource for the current bearer in the range of the maximum network resource. Compared with the first, second, and third embodiments, the PDN gateway further includes a sending unit 3403. The obtaining unit 3401 sends the obtained maximum network resource to the sending unit 3403. The sending unit 3403 sends the maximum network resource to the ENB corresponding to the UE.

Figure 19:
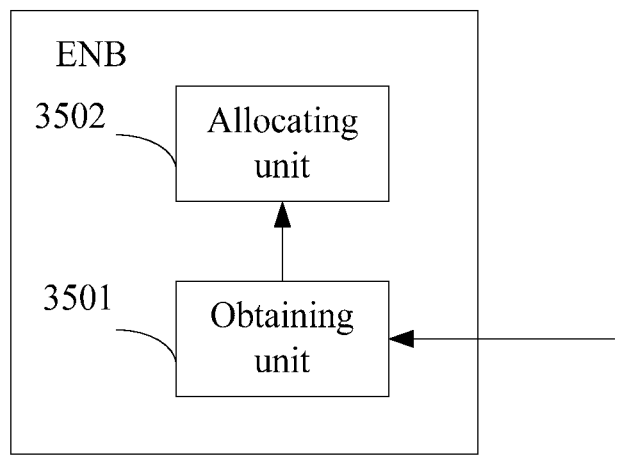
FIG. 19 is a structural diagram of an ENB according to the second technical scheme of the present invention.

In addition, the internal structure of the ENB in FIG. 6, FIG. 12, FIG. 16, and FIG. 17 may be the same as that shown in FIG. 19. As shown in FIG. 19, the ENB includes at least an obtaining unit 3501 and an allocating unit 3502. When the UE connected to the ENB sets up a bearer, the obtaining unit 3501 obtains the preset maximum network resource corresponding to the UE on the PDN or PDN set, and sends the maximum network resource to the allocating unit 3502. The allocating unit 3502 receives the maximum network resource and allocates a resource for the current bearer in the range of the maximum network resource.

The second technical scheme of the present invention has been described above. The method for sharing network resources provided by embodiments of the present invention includes setting the maximum network resource corresponding to the UE on the PDN or PDN set. When the UE sets up a bearer with the PDN or PDN set, allocating, by the PDN gateway connecting the UE and the PDN or PDN set and by the ENB corresponding to the UE, a resource for the current bearer in the range of the maximum network resource, thus sharing the maximum network resource among multiple bearers. The second technical scheme of the present invention also provides a system, an ENB and a PDN gateway for sharing network resources. Embodiments of the present invention implement sharing of a maximum transmission rate among multiple bearers in the evolved network, solve the problem of low network resource utilization caused by the fact that each bearer occupies a fixed bandwidth resource, and implement maximum utilization of network resources.

Although the present invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents.

What is claimed is:

1. A method for sharing network resources, comprising:
   receiving, by a Packet Data Network (PDN) gateway, connecting a User Equipment (UE) and one of a PDN and a PDN set, and an Evolved NodeB (ENB) corresponding to the UE, sharing information associated with a maximum network resource corresponding to the UE on one of the PDN and the PDN set from a Mobility Management Entity (MME), wherein the sharing information is obtained by the MME from a Home Subscriber Server (HSS) corresponding to the UE;
   determining, by the PDN gateway and the ENB, the maximum network resource according to the received sharing information;
   allocating, by the PDN gateway and the ENB a resource for a bearer set up with one of the PDN and the PDN set in a range of the maximum network resource according to the determined maximum network resource.

2. The method of claim 1 wherein the allocating step comprises:
   configuring, by the PDN gateway and the ENB, the determined maximum network resource; and
   allocating, by the PDN gateway and the ENB, the resource for the bearer in the range of the configured maximum network resource.

3. The method of claim 1 wherein: the sharing information includes one of the maximum network resource and a sharing identifier of the maximum network resource,
   the method further comprises:
   storing, by the PDN gateway and the ENB, a correspondence between the maximum network resource and the sharing information; and
   wherein the step of determining, by the PDN gateway and the ENB, the maximum network resource according to the received sharing information comprises:
   determining, by the PDN gateway and the ENB, the maximum network resource corresponding to the sharing information according to the stored correspondence and the received sharing information.

4. The method of claim 3, wherein the maximum network resource includes one of an Aggregate Maximum Bit Rate (AMBR), a Maximum Bit Rate (MBR), and a Guaranteed Bit Rate (GBR).

5. A method for sharing network resources, comprising:
   obtaining, by a Packet Data Network (PDN) gateway connecting a User Equipment (UE) and one of a PDN and a PDN set, sharing information associated with a maximum network resource from a Policy and Charging Rule Function (PCRF) connected with the PDN gateway, when the UE sets up a bearer with one of the PDN and the PDN set for the first time;
   sending, by the PDN gateway, the obtained sharing information to an Evolved NodeB (ENB) corresponding to the UE; and
   determining, by the PDN gateway and the ENB, the maximum network resource according to the sharing information;
   allocating, by the PDN gateway and the ENB a resource for a bearer set up with one of the PDN and the PDN set in a range of the maximum network resource according to the determined maximum network resource.

6. The method of claim 5, wherein the process of the PDN gateway obtaining the sharing information from the connected PCRF comprises:
   sending, by the PCRF, stored sharing information the PDN gateway when the PCRF stores the sharing information;
   obtaining, by the PCRF, the sharing information from a Subscription Profile Repository (SPR), and
   sending the sharing information to the PDN gateway when the PCRF does not store the sharing information but the SPR corresponding to the UE stores the sharing information.

7. A method for sharing network resources, comprising:
   storing, by a Packet Data Network (PDN) gateway connecting a User Equipment (UE) and one of a PDN and a PDN set, a maximum network resource and a sharing identifier corresponding to the UE;
   obtaining, by the PDN gateway, a sharing identifier of the UE corresponding to one of the PDN and the PDN set,
   determining, by the PDN gateway, the maximum network resource corresponding to the UE according to the obtained sharing identifier and a correspondence between the stored maximum network resource and the stored sharing identifier,
   sending, by the PDN gateway, the maximum network resource to an Evolved NodeB (ENB) corresponding to the UE; and
   allocating, by the PDN gateway and the ENB a resource for a bearer set up with one of the PDN and the PDN set in a range of the maximum network resource according to the determined maximum network resource.

8. The method of claim 7, wherein the obtaining step comprises:
   receiving, by the PDN gateway, the sharing identifier of the UE corresponding to one of the PDN and the PDN set from a MME, wherein the received sharing identifier is obtained from a HSS by the MME.

9. A method for sharing network resources, comprising:
   receiving, by a Packet Data Network (PDN) gateway, connecting a User Equipment (UE) and one of a PDN and a PDN set, and an Evolved NodeB (ENB) corresponding to the UE, sharing identifier information reflecting a maximum network resource of the UE on one of the PDN and the PDN set from a Mobility Management Entity (MME), wherein the sharing identifier information is obtained by the MME based on an established bearer for the UE when the UE sets up a non-first bearer with one of the PDN and the PDN set;
   determining, by the PDN gateway and the ENB, the maximum network resource corresponding to the UE according to the sharing identifier information;
   allocating, by the PDN gateway and the ENB, a resource for the established bearer and the non-first bearer of the UE in the range of the maximum network resource according to the determined maximum network resource.

10. The method of claim 9, wherein: the sharing identifier information reflecting the established bearer of the UE on one of the PDN and the PDN set comprises one of an Evolved Packet system (EPS) bearer ID of any bearer among the established bearers, an EPS bearer ID of an established first bearer of the UE on the PDN or PDN set, and a sharing identifier information set obtained when the UE sets up a first bearer.

11. A method for sharing network resources, comprising:
determining, by a Packet Data Network (PDN) gateway connecting a User Equipment (UE) and one of a PDN and a PDN set, a maximum network resource corresponding to the UE based on an established bearer for the UE when the UE sets up a non-first bearer with the PDN or PDN set;
obtaining, by the PDN gateway, sharing identifier information reflecting the maximum network resource of the UE on one of the PDN and the PDN set;
sending, by the PDN gateway, the sharing identifier information to an Evolved NodeB (ENB) corresponding to the UE; and
determining, by the ENB, the maximum network resource according to the sharing identifier information;
allocating, by the PDN gateway and the ENB, a resource for the established bearer and the non-first bearer of the UE in the range of the maximum network resource according to the determined maximum network resource.

12. The method of claim 11, wherein: the sharing identifier information reflecting the established bearer of the UE on one of the PDN and the PDN set comprises one of an Evolved Packet system (EPS) bearer ID of any bearer among the established bearers, an EPS bearer ID of an established first bearer of the UE on the PDN or PDN set, and a sharing identifier information set obtained when the UE sets up a first bearer.

13. A system for sharing network resources, comprising at least a User Equipment (UE), an Evolved NodeB (ENB), a Packet Data Network (PDN) gateway, and one of a PDN and a PDN set, wherein:
the system further comprises an information database network element for providing the maximum network resource set on one of the PDN and the PDN set for the UE;
the PDN gateway obtains the maximum network resource corresponding to the UE on one of the PDN and the PDN set from the information database network element when the UE and one of the PDN and the PDN set connected to the PDN gateway set up a bearer, and the PDN gateway allocates a resource for the bearer in the range of the maximum network resource; and
the ENB obtains the preset maximum network resource corresponding to the UE on one of the PDN and the PDN set from the information database network element when the UE connected to the ENB sets up a bearer, and allocates a resource for the bearer in the range of the maximum network resource;
wherein if the information database network element is a Home Subscriber Server (HSS), the PDN gateway and the ENB obtain the maximum network resource provided by the HSS through a Mobility Management Entity (MME); or wherein if the information database network element comprises a Policy and Charging Rule Function (PCRF) and a Subscription Profile Repository (SPR), the PCRF sends stored sharing information associatied with the maximum network resource corresponding to the UE on one of the PDN and the PDN set to the PDN gateway when the PCRF stores the sharing information; and
the PCRF obtains the sharing information associatied with the maximum network resource corresponding to the UE on one of the PDN and the PDN set from a Subscription Profile Repository (SPR) and sends the obtained sharing information to the PDN gateway, when the PCRF does not store the sharing information and the SPR corresponding to the UE stores the sharing information.

14. The system of claim 13, wherein if the information database network element is the HSS,
the ENB obtains the maximum network resource through the PDN gateway.

15. An apparatus for sharing network resources, comprising:
an obtaining unit for obtaining a preset maximum network resource corresponding to a User Equipment (UE), on one of a Packet Data Network (PDN) and a PDN set when the UE sets up a bearer with one of the PDN and the PDN set, and sending the maximum network resource to the allocating unit, wherein the obtaining unit obtains the preset maximum network resource from a Mobility Management Entity (MME), and the preset maximum network resource is obtained by the MME from a Home Subscriber Server (HSS) corresponding to the UE; and
an allocating unit for receiving the maximum network resource and allocating a resource for the bearer in the range of the maximum network resource.

16. The apparatus of claim 15, wherein the apparatus is one of an Evolved NodeB (ENB) and a PDN gateway.

* * * * *